(12) United States Patent
Straitiff et al.

(10) Patent No.: US 11,396,150 B2
(45) Date of Patent: Jul. 26, 2022

(54) TIRE PREPARATION FOR ADHESIVE USING LASER ABLATION SYSTEM AND METHOD

(71) Applicant: Android Industries LLC, Auburn Hills, MI (US)

(72) Inventors: Donald Graham Straitiff, Howell, MI (US); Barry A. Clark, Ortonville, MI (US); Lawrence J. Lawson, Troy, MI (US); Keith Masserang, Bloomfield Hills, MI (US)

(73) Assignee: Android Industries LLC, Auburn Hills, MI (US)

( * ) Notice: Subject to any disclaimer, the term of this patent is extended or adjusted under 35 U.S.C. 154(b) by 605 days.

(21) Appl. No.: 16/274,856

(22) Filed: Feb. 13, 2019

(65) Prior Publication Data

US 2019/0248084 A1 Aug. 15, 2019

Related U.S. Application Data

(60) Provisional application No. 62/630,439, filed on Feb. 14, 2018.

(51) Int. Cl.
  *B29D 30/00* (2006.01)
  *B23K 26/36* (2014.01)
  (Continued)

(52) U.S. Cl.
  CPC ........ *B29D 30/0633* (2013.01); *B23K 26/352* (2015.10); *B23K 26/36* (2013.01);
  (Continued)

(58) Field of Classification Search
  CPC ......... B60C 25/05; B60C 23/04; B60C 23/20; B08B 7/00; B23K 26/40; B29C 33/72;
  (Continued)

(56) References Cited

U.S. PATENT DOCUMENTS 6,615,649 B1 * 9/2003 Kokubu ............. B29D 30/0016
                                                         73/146
8,330,074 B2 * 12/2012 Crim ...................... B23K 26/36
                                                       219/121.68
(Continued)

FOREIGN PATENT DOCUMENTS

CN       1706629 A    12/2005
CN     101878124 A    11/2010
(Continued)

OTHER PUBLICATIONS

International Search Report for International Application No. PCT/US2019/017916 dated Jun. 3, 2019.
(Continued)

*Primary Examiner* — Geoffrey S Evans
(74) *Attorney, Agent, or Firm* — Miller Johnson

(57) ABSTRACT

A system for preparing an interior surface of a tire for an adhesive includes a turntable configured to remove a layer of material from the tire, and a manipulator operable to move and rotate the tire. The turntable includes a platform rotatable about a first axis. An ablation module is disposed within the platform and includes one or more lasers each configured to emit a laser beam for removing the layer of material from the tire. A plurality of guide rollers extend from the platform and are operable between a retracted position and an extended position to selectively secure the tire to the platform. An exhaust system is disposed adjacent to the one or more lasers.

20 Claims, 8 Drawing Sheets

(51) Int. Cl.
  *B29D 30/06* (2006.01)
  *B23K 26/352* (2014.01)
  *B23K 26/362* (2014.01)
  *B23K 26/402* (2014.01)

(52) U.S. Cl.
  CPC .......... *B23K 26/362* (2013.01); *B23K 26/402* (2013.01); *B29D 2030/0638* (2013.01)

(58) Field of Classification Search
  CPC .. B29D 30/00; B29D 30/0633; G05B 19/418; H01L 21/67282; G01M 17/02
  See application file for complete search history.

(56) References Cited

U.S. PATENT DOCUMENTS

| | | | |
|---|---|---|---|
| 2010/0243127 A1* | 9/2010 | Chebli | B29D 30/0005 156/64 |
| 2014/0379116 A1* | 12/2014 | Nicholson | B29D 30/0633 700/160 |
| 2015/0306707 A1* | 10/2015 | Nicholson | G05B 19/41875 700/110 |
| 2018/0111427 A1* | 4/2018 | Seo | B60C 1/0008 |
| 2018/0318888 A1* | 11/2018 | Matsumura | B23K 26/361 |

FOREIGN PATENT DOCUMENTS

| | | |
|---|---|---|
| CN | 102632779 A | 8/2012 |
| CN | 104903809 A | 9/2015 |
| CN | 105856985 A | 8/2016 |
| CN | 107030065 A | 8/2017 |
| DE | 102013220066 B3 | 12/2014 |
| EP | 2674287 A1 | 12/2013 |
| EP | 3135424 A1 | 3/2017 |
| EP | 3175975 A1 | 6/2017 |
| JP | 2002-503551 A | 2/2002 |
| JP | 2005-350057 A | 12/2005 |
| WO | WO-2017-082162 A1 | 5/2017 |

OTHER PUBLICATIONS

European Patent Office, Extended European Search Report for EP Application No. 19754287.1, dated Oct. 21, 2021.
China National Intellectual Property Administration, Notification of the First Office Action for CN App. No. 201980012907.0, dated Dec. 3, 2021.
China National Intellectual Property Administration, Notification of Second Office Action for CN 201980012907.0, dated Apr. 19, 2022.
Shouyong Liu, Machine Manufacturing Technology and Machine Tool Jigs (Mechanical Manufacturing Processes and Machine Tool Fixtures), pp. 190-191, China Machine Press, Beijing, Jul. 1994, first edition.

* cited by examiner

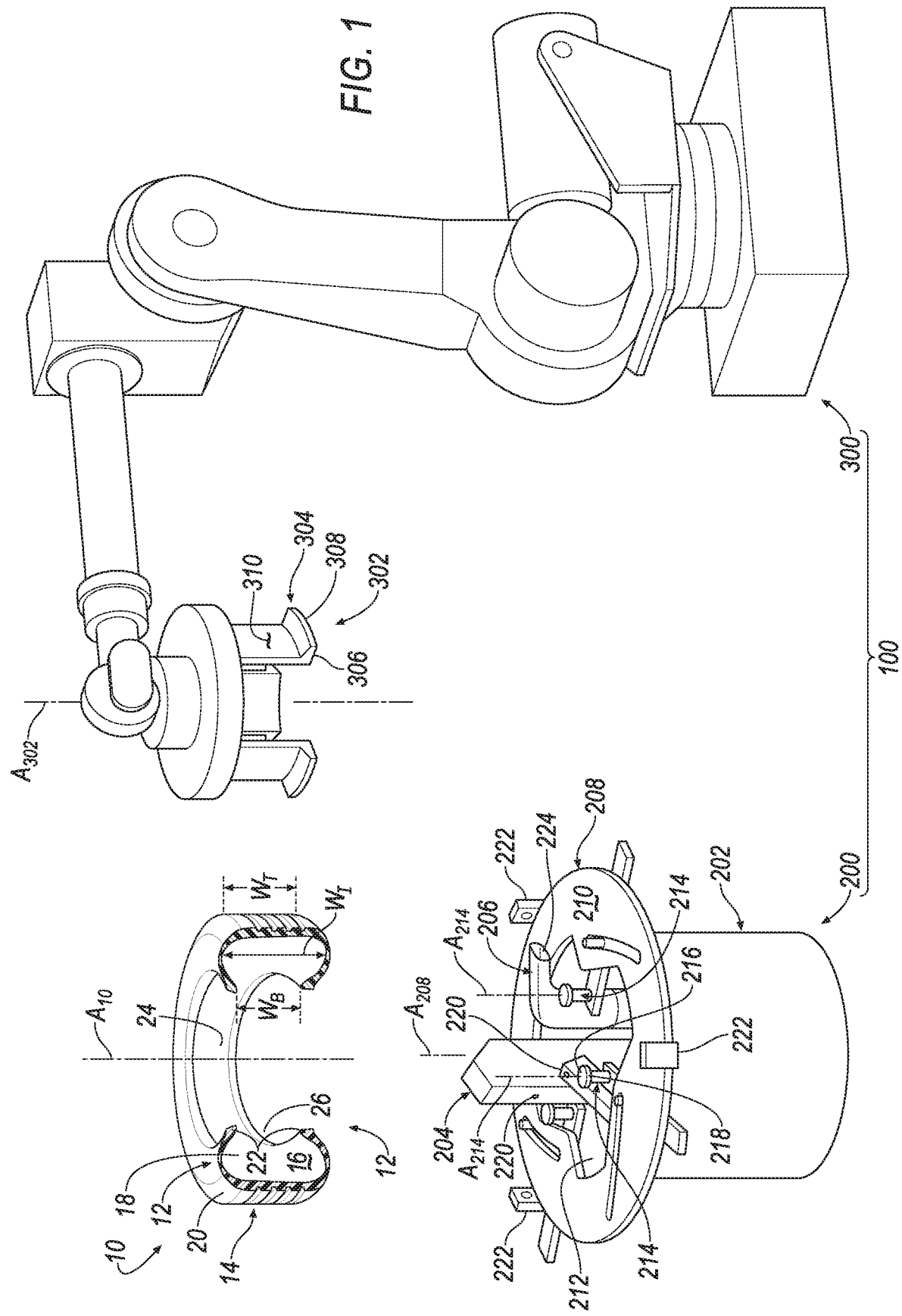

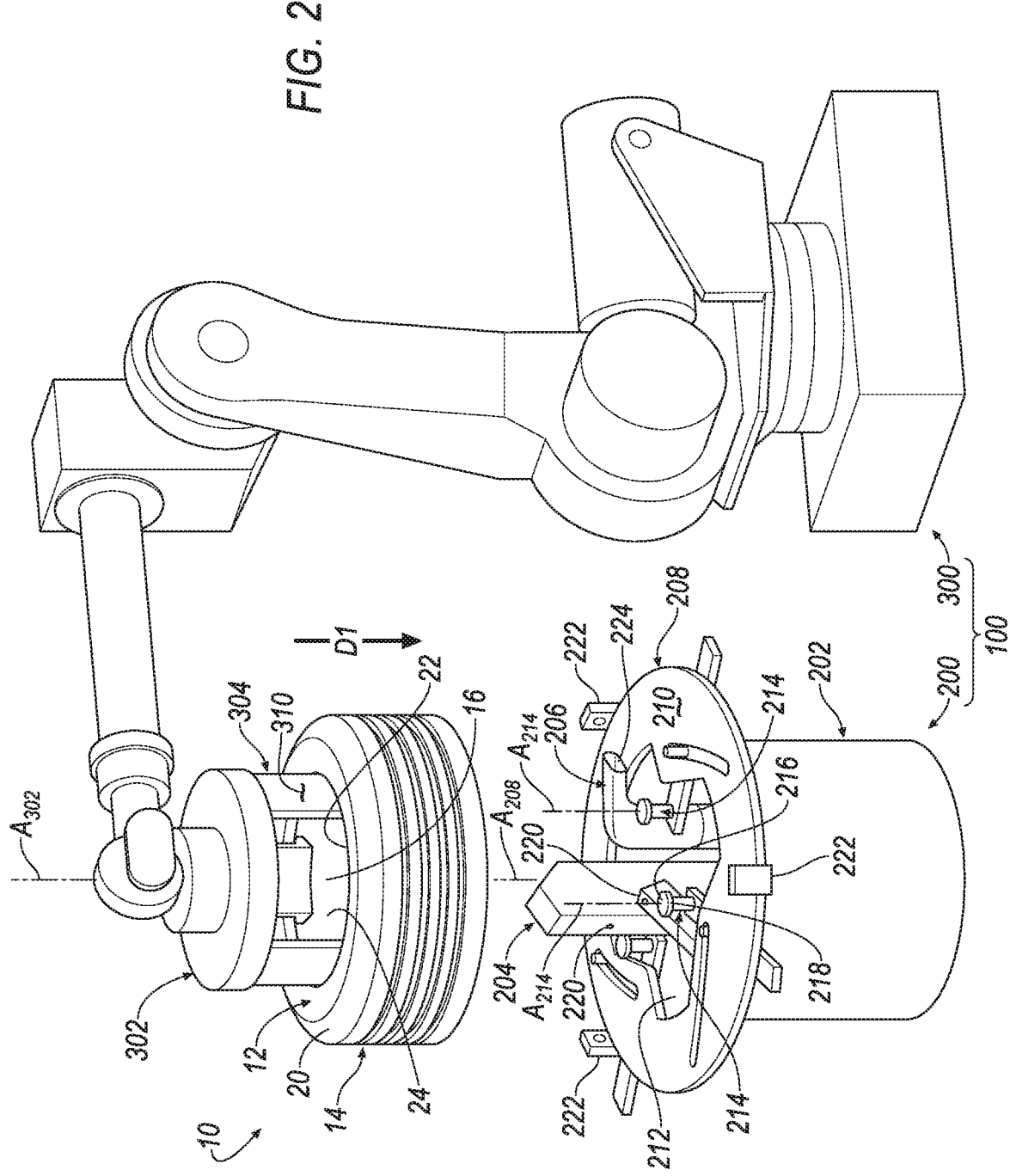

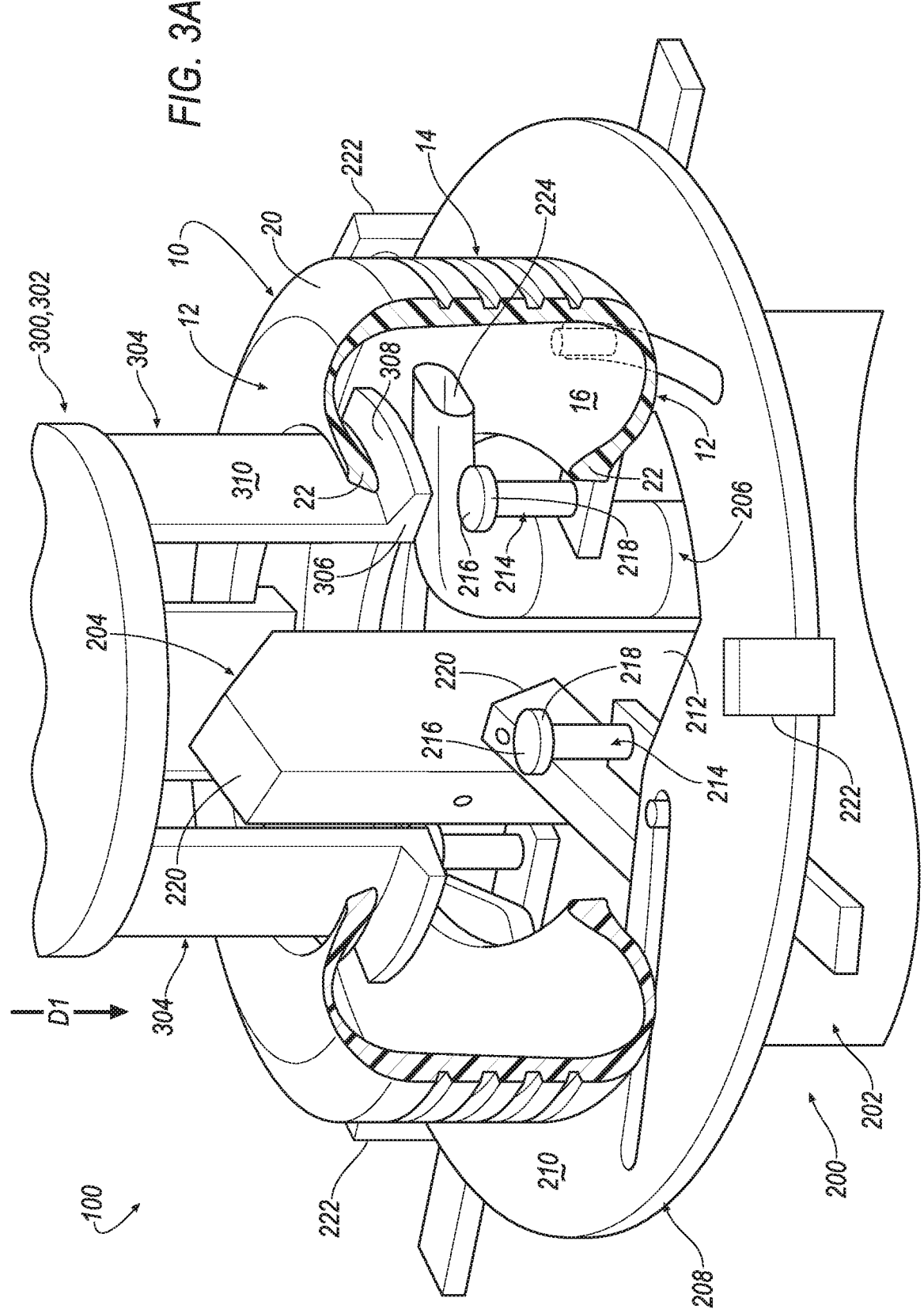

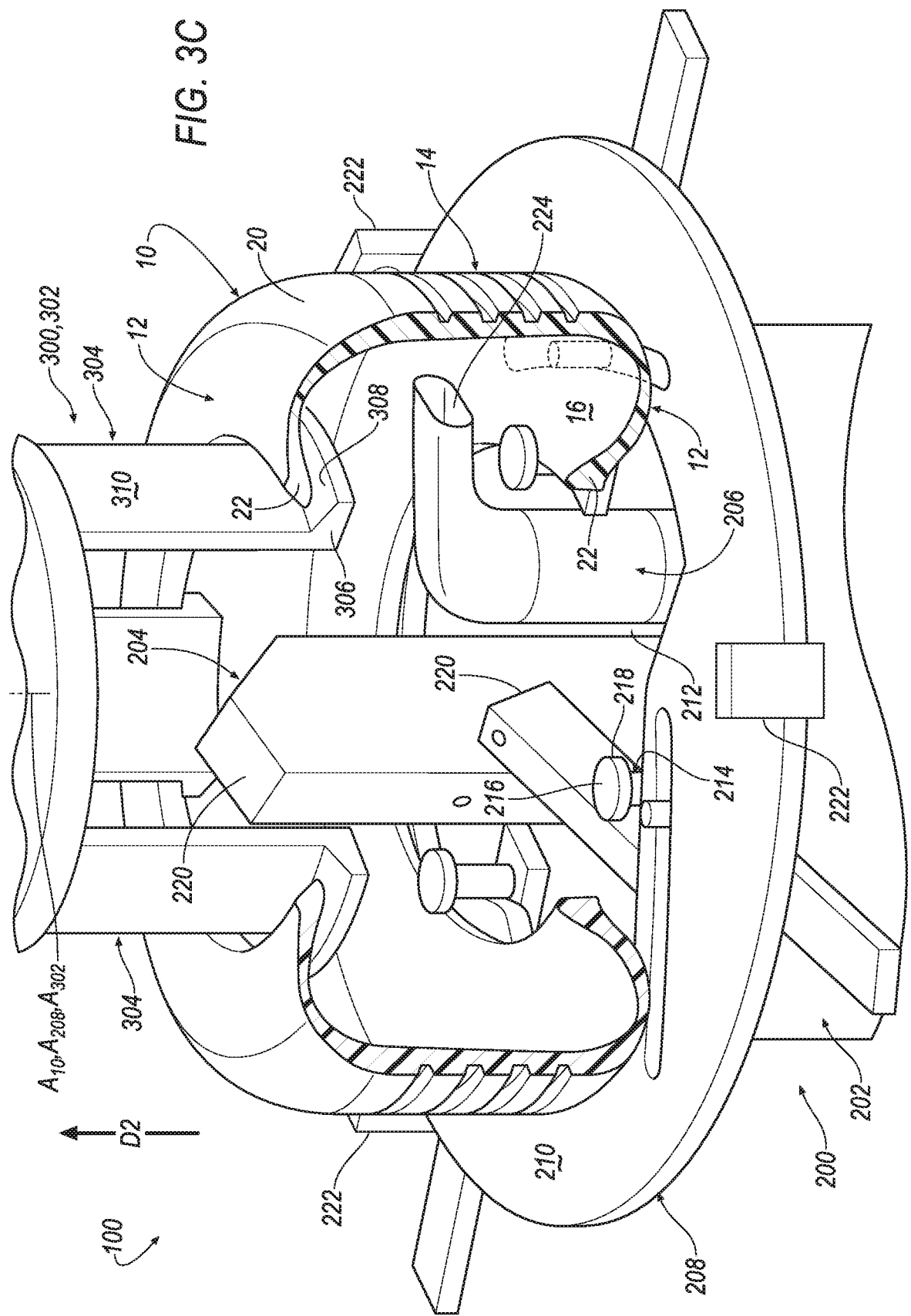

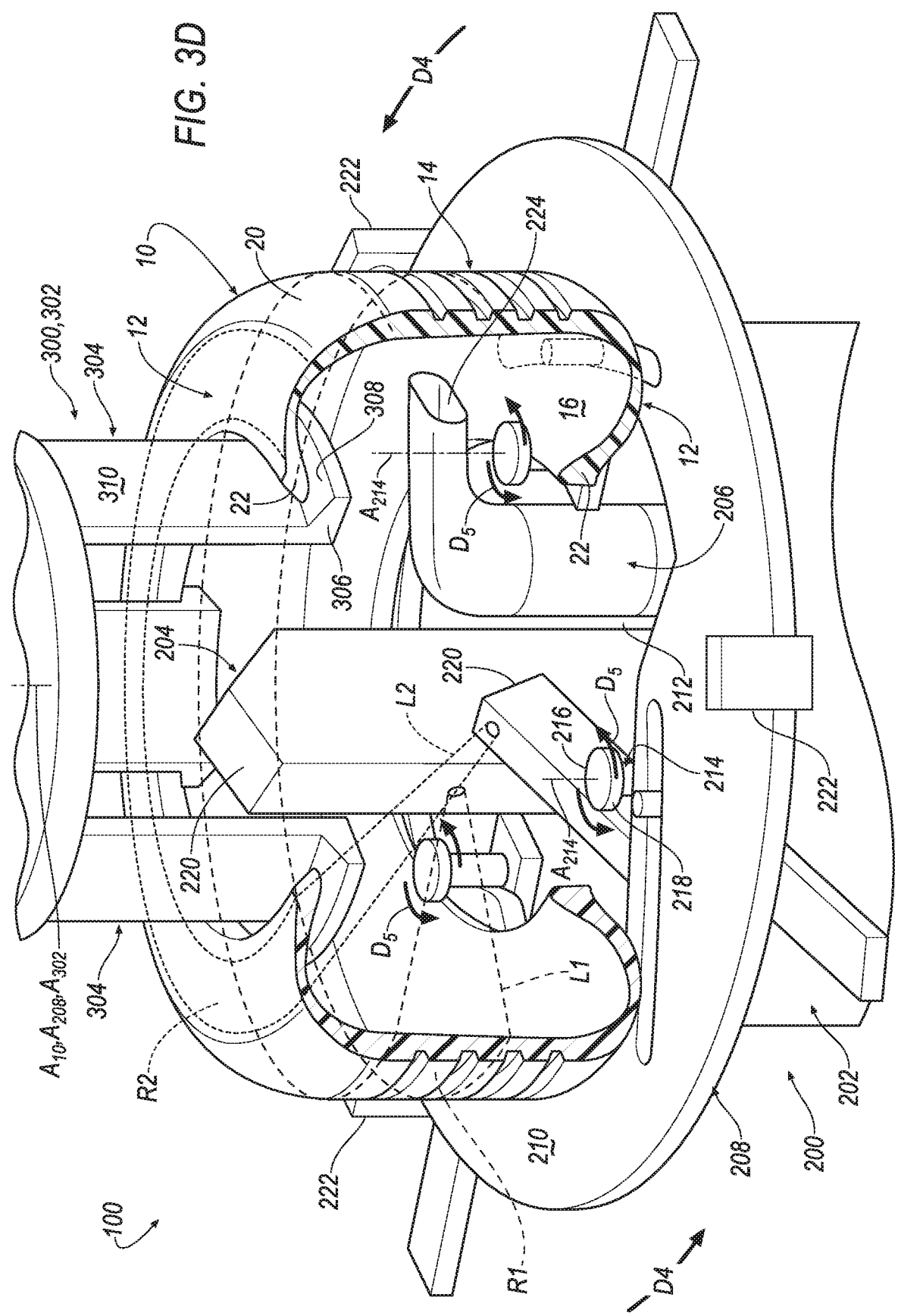

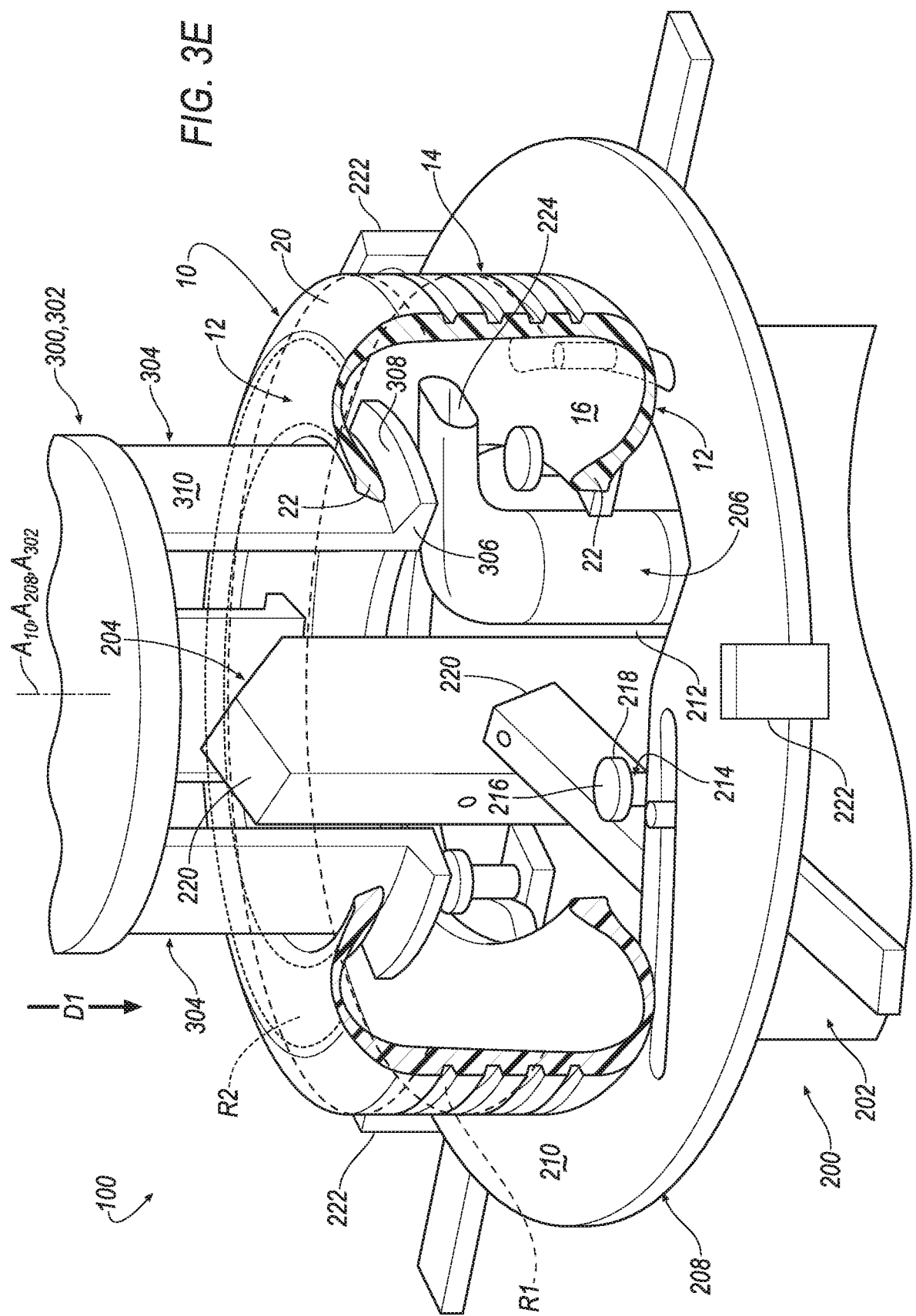

TIRE PREPARATION FOR ADHESIVE USING LASER ABLATION SYSTEM AND METHOD

CROSS REFERENCE TO RELATED APPLICATIONS

This patent application claims priority under 35 U.S.C. § 119(e) to U.S. Provisional Application 62/630,439, filed on Feb. 14, 2018. The disclosure of this prior application is considered part of the disclosure of this application and is hereby incorporated by reference in its entirety.

FIELD

The disclosure relates to a system and method for preparing a tire carcass for adhesive using laser ablation.

BACKGROUND

There are applications where it is advantageous to prepare the inside of a tire so that it will readily accept adhesives or other adhesive-like substances. For example, modern tires may be provided with a peripheral device, such as an RFID chip, configured to measure properties of the tire, such as manufacturing dates and locations, lifespan, numbers of rotations, and the like. However, the exterior surfaces of tires may be covered in a thin layer of film imparted during the tire manufacturing process. In order for peripherals to be securely adhered to the tire, the film layer must be removed to present a clean adhesion surface. Accordingly, there exists a need in the art for a system and method for preparing an interior surface of a tire for application of an adhesive.

SUMMARY

The details of one or more implementations of the disclosure are set forth in the accompanying drawings and the description below. Other aspects, features, and advantages will be apparent from the description and drawings, and from the claims.

One aspect of the disclosure provides a method of preparing an interior surface of a tire for an adhesive. The method includes providing a tire ablation system including a treatment station having one or more lasers each configured to emit a laser beam. The method further includes positioning the tire at the treatment station, and activating the one or more lasers and directing the laser beam of each of the one or more lasers at the interior surface of the tire, the laser beam operable to remove a layer of material from the interior surface of the tire to form. The tire is rotated about the one or more lasers to form one or more preconditioned regions having the layer of the material removed.

Implementations of the disclosure may include one or more of the following optional features. In some implementations, activating the one or more lasers includes activating a first laser having a first laser beam directed at a tread portion of the interior surface and activating a second laser having a second laser beam directed at a sidewall portion of the interior surface.

In some examples, activating the one or more lasers includes operating the one or more lasers at an output of 100 watts, a wavelength of 1064 nm, a pulse repetition frequency ranging from 1 kHz to 1000 kHz, and a pulse duration ranging from 1 nanosecond to 500 nanoseconds.

In some implementations wherein the tire is rotated at a rate ranging from 0.5 revolutions per minute to 3.0 revolutions per minute.

In some implementations, providing the tire ablation system includes providing a manipulator having an end effector. Here, the tire is rotated by the end effector.

In some examples, providing the tire ablation system includes disposing an exhaust system adjacent to the interior surface of the tire.

In some implementations, the method further comprises securing the tire to the treatment station. Here, the tire includes a first sidewall and a second sidewall, and the method further comprises securing the first sidewall to the treatment station and moving the second sidewall away from the first sidewall.

In some examples, the method further comprises adhering one or more sensors to the preconditioned region.

Another aspect of the disclosure provides a system for preparing an interior surface of a tire for an adhesive, the tire including an interior cavity defined by a pair of sidewalls each including an annular bead portion. The system comprises a turntable having a platform rotatable about a first axis, an ablation module disposed within the platform and including one or more lasers, a plurality of guide rollers extending from the platform, and an exhaust system disposed adjacent to the one or more lasers. This aspect may include one or more of the following optional features.

In some examples, the system comprises a manipulator having an end effector operable between a first position adjacent to the turntable and a second position spaced apart from the turntable.

In some implementations, the end effector is rotatable about a second axis, wherein in the first position the second axis is coaxially aligned with the first axis and in the second position the second axis is spaced apart from the first axis. In some examples, the end effector may include a plurality of fingers operable between a retracted position spaced radially inwardly from the bead portion of one of the sidewalls, and an extended position contacting the bead portion of the one of the sidewalls.

In some examples, the one or more lasers include a 100 watt Q-switch fiber laser operating at a frequency of 1064 nm within a pulse rate range of 1 to 1000 kHz. In some examples, the one or more laser is a 200 watt MOPA fiber laser operating at a frequency of 1064 nm within a pulse rate range of 0 to 1000 kHz.

In some implementations, each of the guide rollers is operable between a retracted position spaced inwardly from the tire, and an extended position contacting the tire. Here, each of the guide rollers is rotatable about a respective third axis parallel to the first axis, and includes a radial projection configured to extend into an interior cavity of the tire when the guide rollers are in the extended position.

In some examples, the exhaust system is configured to be disposed within the interior cavity of the tire.

In some configurations, the system comprises a plurality of sensors disposed adjacent to the platform and configured to measure a position of the tire relative to the platform.

DESCRIPTION OF THE DRAWINGS

The disclosure will now be described, by way of example, with reference to the accompanying drawings, in which:

FIG. 1 is a perspective view of a tire ablation system according to the principles of the present disclosure, where the tire ablation system is in a first configuration.

FIG. 2 is a perspective view of the tire ablation system of FIG. 1, where the system is in a second configuration.

FIG. 3A is a fragmentary perspective view of the system of FIG. 1, and illustrates one step of a method of cleaning a tire using the system.

FIG. 3C is a fragmentary perspective view of the system of FIG. 1, and illustrates another step of a method of cleaning a tire using the system.

FIG. 3D is a fragmentary perspective view of the system of FIG. 1, and illustrates another step of a method of cleaning a tire using the system.

FIG. 3E is a fragmentary perspective view of the system of FIG. 1, and illustrates another step of a method of cleaning a tire using the system.

Corresponding reference numerals indicate corresponding parts throughout the drawings.

DETAILED DESCRIPTION

Figure 3B:
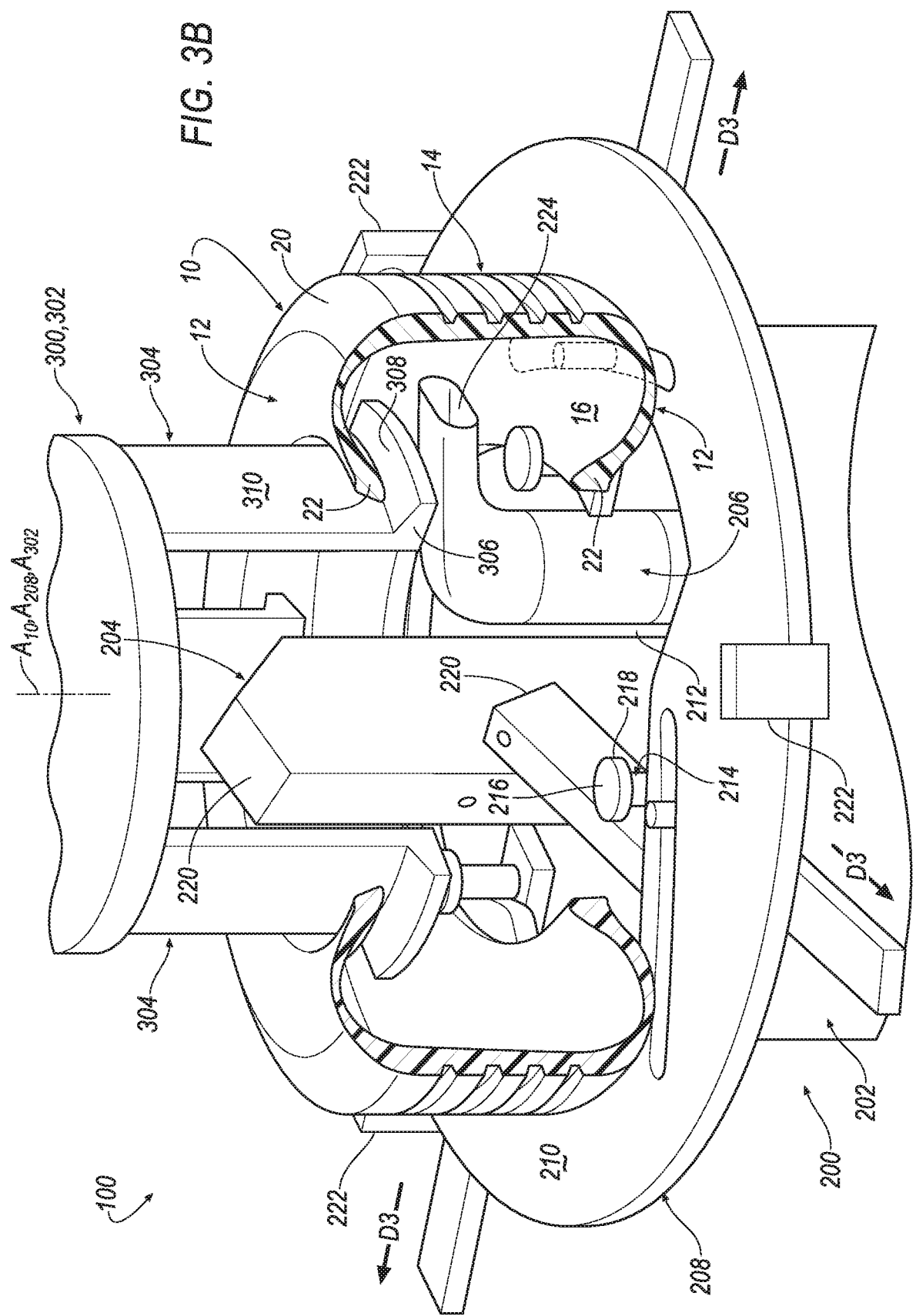
FIG. 3B is a fragmentary perspective view of the system of FIG. 1, and illustrates another step of a method of cleaning a tire using the system.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The figures illustrate an exemplary implementation of a system and method for preparing a tire carcass for adhesive using laser ablation. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIG. 1, which illustrates an exemplary tire 10 for use in conjunction with the tire ablation system 100 described below. Generally, the geometry of the tire 10 may be described as including an opposing pair of annular sidewalls 12 and a tread portion 14 extending between and connecting the sidewalls 12. Each of the sidewalls 12 and the tread portion 14 cooperate to provide an interior liner surface 16, which defines an annular interior cavity 18 of the tire 10.

With continued reference to FIG. 1, each of the sidewalls 12 extends radially-inwardly from a shoulder portion 20 to a bead portion 22. The shoulder portion 20 is disposed adjacent to the tread portion 14. As shown, the bead portion 22 of each of the sidewalls 12 defines a circular sidewall opening 24 through each of the respective the sidewalls 12. The bead portions 22 of the sidewalls 12 oppose each other, and are spaced apart from each other to define an annular cavity opening 26, which provides access into the interior cavity 18 of the tire 10.

Each sidewall 12 may have a bulged shape, whereby an intermediate portion of the sidewall 12 between the shoulder portion 20 and the bead portion 22 is concave with respect to the interior cavity 16. Accordingly, a width of the tire 10 measured across the intermediate portions of the sidewalls 12 is greater than the width of the tire 10 measured across the bead portions 20 of the sidewalls 12. Likewise, a width of the cavity opening 26 corresponds to the width $W_B$ between the bead portions 22, and may be less than a width $W_1$ of the cavity 28 at an intermediate portion of the sidewall 12 (i.e., between the bead portion 22 and shoulder portion 20) when the tire 10 is in a relaxed state. Furthermore, the width of the cavity opening 26 may be less than a width $W_T$ of the tread portion 14 of the tire 10 when the tire 10 is in a relaxed state.

With continued reference to FIG. 1, a tire ablation system 100 according to the instant disclosure includes a treatment station 200 and a manipulator 300. Generally, the treatment station 200 is configured to receive the tire 10 and to provide a treatment process to the interior liner surface 16 of the tire 10, as discussed in greater detail below. The manipulator 300 is configured to move the tire 10 to and from the treatment station 200. In some examples, the manipulator 300 may cooperate with the treatment station 200 during the treatment process to control a position and/or orientation of the tire 10.

Referring still to FIG. 1, the treatment station 200 includes a turntable 202, an ablation module 204, and an exhaust system 206. Generally, the turntable 202 is operable to receive and support the tire 10 during the ablation process, while the ablation module 204 is operable to clean the interior liner surface 16 of the tire 10. The exhaust system 206 is configured to draw a vacuum within the interior cavity 18 of the tire 10 during the ablation process to minimize the emission of fumes and/or debris into the environment surrounding the tire 10.

As shown in FIG. 1, the turntable 202 includes a platform 208 having a substantially planar top surface 210. The platform 208 is rotatable about a vertical central axis $A_{208}$. In some examples, the platform 208 is rotated by a drivetrain (not shown) of the turntable 202. However, in the illustrated example, rotation of the platform 208 is passive, and is controlled by the manipulator 300, as explained in greater detail below.

The platform 208 defines a central opening or hub 212, which receives the ablation module 204 and the exhaust system 206. As shown, the turntable 202 further includes a plurality of guide rollers 214 proximate to an outer periphery of the hub 212. Each of the guide rollers 214 is rotatable about a respective axis $A_{214}$ parallel to the central axis $A_{208}$ of the platform 208, and extends from the top surface 210 of the platform 208 to a distal end 216 spaced apart from the top surface 210 along the vertical direction. Each guide roller 214 includes one or more radial projections 218 extending radially outwardly therefrom. In the illustrated example, the one or more radial projections 218 include a continuous flange 218 extending radially outwardly from the distal end 216 of the guide roller 214. However, in other examples the radial projections 218 may include one or more radial projections 218 extending radially outwardly with respect to the central axis $A_{208}$ of the platform 208.

As discussed below, the radial projection 218 of each guide roller 214 is configured interface with the sidewall 12 of the tire 10 to retain a vertical position of the bead portion 22. Particularly, each of the guide rollers 214 is operable between a retracted position, whereby each guide roller 214 is positioned radially inwardly from the bead portion 22 (i.e., within the sidewall opening 24), as shown in FIG. 3A, and an extended position in contact with the bead portion 22, as shown in FIG. 3B. As shown in FIG. 3B, when the guide rollers 214 are in the extended position, the bead portion 22 of the lower sidewall 12 will be captured by the radial projection 218 to limit the vertical lifting of the bead portion 22 from the platform 208. An extension force of each of the guide rollers 214 is limited to maintain the integrity and shape of the bead portion 22.

Referring again to FIG. 1, the ablation module 204 is disposed within the central hub 212 and is configured to be received through the sidewall openings 24 of the tire 10 when the tire 10 is presented to the platform 208. In the illustrated example, rotation of the ablation module 204 is fixed relative to the central axis $A_{208}$, such that the platform 208 rotates around the ablation module 204.

As best shown in FIG. 3D, the ablation module 204 is configured to clean or deglaze at least a portion of the interior liner surface 16 of the tire 10 to maximize adhesion characteristics of the interior liner surface 16. The ablation module 204 includes one or more lasers 220 configured to deglaze at least a portion of the interior liner surface 16 of the tire 10, creating one or more preconditioned regions R1, R2 to which peripheral devices (e.g., sensors, chips) can be adhered. In the illustrated example, the ablation module 204 includes a first laser 220 configured to project a first laser beam L1 towards the interior liner surface 16 of the tire 10 along the tread portion 14, and a second laser 220 configured to project a second laser beam L2 directed towards the interior liner surface 16 along one of the sidewalls 12 of the tire 10. Accordingly, the ablation module 204 is configured to deglaze the interior liner surface 16 along the one of the sidewalls 12 and along the tread portion 14.

Here, each of the lasers 220 may be independently mounted from each other, whereby each laser 220 can be uniquely positioned to clean a desired portion of the interior surface liner 16. Thus, although two separate preconditioned regions R1, R2 are illustrated, the lasers 220 may be configured to cooperate with each other to form a single, continuous treatment region extending from the sidewall 12 to the tread portion 14.

In some examples, the laser 220 may be a 100 watt, Q-switched fiber laser operating at a wavelength of 1064 nm. The laser 220 may be configured to provide an output of up to 100 watts, with a maximum pulse energy of less than 2.0 millijoules, a repetition frequency ranging from 1 kHz to 1000 kHz, and a pulse duration ranging from 1 nanosecond to 500 nanoseconds. Alternatively, in some examples the laser 220 may be a 200 watt MOPA fiber laser operating at a frequency of 1064 nm within a pulse rate range of 0 to 1000 kHz. In some examples, by manipulating at least one of the pulse rate, frequency, power, and laser direction, the inner surface 1 of tire 10 only experiences negligible temperature increase during the deglazing step, as described in great detail below.

The treatment station 200 may further include one or more position sensors 222 for identifying when the tire 10 is properly positioned on the platform 208. For example, the treatment station 200 may include a plurality of sensors 222 positioned around the outer periphery of the platform 208 for determining when the tire 10 is fully seated against the top surface 210 of the platform 208. As discussed below, once the sensors 222 signal that the tire 10 is properly positioned on the platform 208, the treatment station 200 may move the guide rollers 214 to the extended position to secure the bead portion 22 of the lower sidewall 12 of the tire 10 on the turntable 202.

As discussed above, the treatment station 200 may include an exhaust system 206 having nozzles 224 selectively disposed within the interior cavity 18 of the tire 10. As with the guide rollers 214, the nozzle 224 may be moved between a retracted position inwardly from the bead portions 22 and an extended position, whereby the nozzle 224 is disposed within the interior cavity 18. In the extended position, the nozzle 224 may be disposed adjacent to one or both of the preconditioned regions R1, R2, whereby the nozzle 224 is configured to remove fumes and debris resulting from the ablation of the liner surface 16. The nozzles 224 may be articulable to assist is positioning the nozzles 224 adjacent to the preconditioned regions R1, R2.

With continued reference to FIGS. 1 and 2, the manipulator 300 is configured to move the tire 10 to and from the treatment station 200. For example, the system 100 may include one or more feed stations or conveyors (not shown) for delivering tires 10 to the system 100, and one or more takeaway stations or conveyors for removing tires form the system 100. The manipulator 300 is operable to retrieve the tire 10 from the feed station, to move the tire to the treatment station 200, and to move the tire 10 from the treatment station 200 to the takeaway station. As discussed below, the manipulator 300 may further be configured for manipulating the tire 10 during the ablation process at the treatment station 200.

In the illustrated example, the manipulator 300 is a multi-axis robotic arm, such as a five-axis robotic arm. The manipulator 300 includes an end effector 302 uniquely configured to grasp and manipulate the tire 10. As shown, the end effector 302 is attached to the end of the manipulator 300, and is configured to rotate about a central axis $A_{302}$. In the illustrated example, the manipulator 300 includes a plurality of elongate fingers 304 radially arranged about the central axis $A_{302}$. Each of the fingers 304 extends substantially parallel to the central axis $A_{302}$ of the end effector 302 to a distal end 306. As shown, the distal end 306 of each finger 304 may include a projection 308 extending radially outwardly the central axis $A_{302}$. The projection 308 may be a flange or lip configured to provide a horizontal surface configured to receive the inner liner surface 16 along the bead portion 22 of the sidewall 12.

Figure 3F:
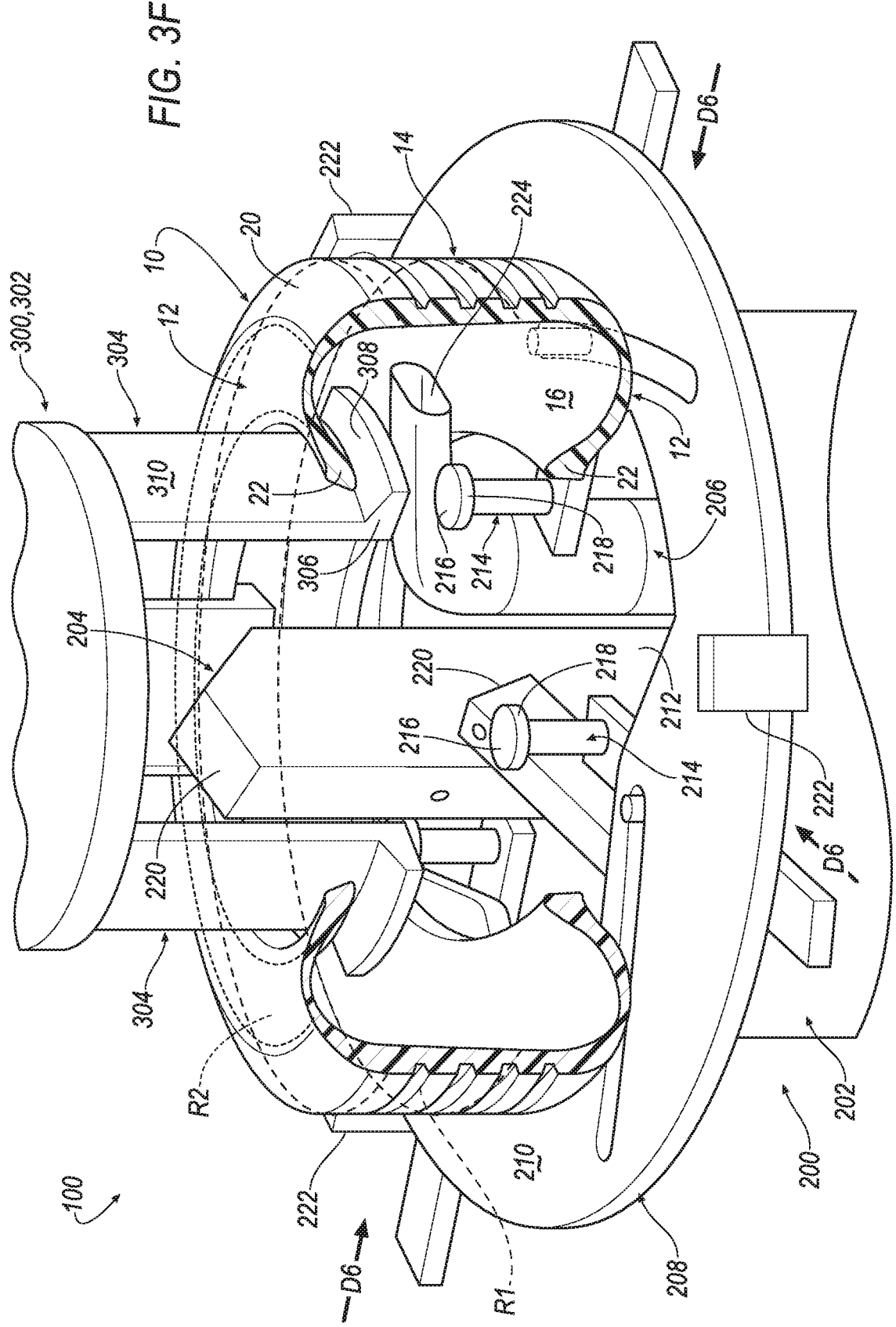
FIG. 3F is a fragmentary perspective view of the system of FIG. 1, and illustrates another step of a method of cleaning a tire using the system.

Each of the fingers 304 is operable between a retracted position, as shown in FIG. 1, and an extended position, as shown in FIGS. 2-3F. The extended position is radially outwardly from the retracted position relative to the central axis $A_{302}$ of the end effector. Accordingly, in the retracted position the distal ends 306 of the fingers 304 are arranged about a first circle having a first diameter, and in the extended position the distal ends 306 of the fingers 304 are arranged about a second circle having a second diameter that is greater than the first diameter.

Generally, and as described in greater detail below, when the fingers 304 are in the retracted position the distal ends 306 of the fingers 304 are configured to be received through the sidewall opening 24 so that the distal ends 306 of the fingers 304 are surrounded by and spaced inwardly from the bead portion 22. Alternatively, when the fingers 304 are in the extended position, an outer surface of each of the fingers 304 will abut the beat portion 22 of the sidewall 12, while the projection 308 of each finger 304 will extend through the cavity opening 26 and contact the interior liner surface 16 adjacent to the bead portion 22.

A force applied by the outer surface 310 of each finger 304 against the bead portion 22 may be regulated within a predetermined range to ensure that the tire 10 is securely handled, while at the same time preventing deformation of the tire 10 and the bead portion 22. For example, a minimum extension force will be suitable to provide a frictional interface between the bead portion 22 and the outer surface 310 of each finger 304, whereby the position of the bead portion 22 is restrained relative to the fingers 304. Accordingly, the tire 10 can be rotated about the central axis $A_{320}$ by rotating the end effector 302. On the other hand, a maximum extension force of the fingers 304 will be limited to protect the integrity of the bead portion 22. For example, the bead portion 22 may include resilient bead seat configured to interface with a wheel to seal the interior cavity 18. Accordingly, the geometry of the bead seat is critical, and the maximum extension force is limited to ensure that the bead seat is not damaged, and that the geometry of the bead portion 22 is not deformed.

Referring now to FIGS. 3A-3F, a method of utilizing the tire ablation system 100 to deglaze the interior liner surface 16 of the tire 10 is illustrated. Initially, the tire 10 may be presented to the system 100 via one or more feed stations, where the manipulator 300 retrieves the tire 10 using the end effector 302. As shown in FIG. 3A, the fingers 304 of the end effector 302 are inserted through an upward-facing one of the sidewall openings 24 and moved to the extended position, whereby the outer surfaces 310 of the fingers 304 interface with an inner surface (i.e., the bead seat) of the bead portion 22. At the same time, the projections 308 formed on the distal end 306 of each finger 304 extends through the cavity opening 26 into the interior cavity 18, and interfaces with the inner liner surface 16 of the tire 10.

With the tire 10 disposed on the end effector 302, the manipulator 300 is operated to position the tire 10 above the platform 208 of the treatment station 200, whereby the center axis $A_{10}$ of the tire 10 is aligned with the center axis $A_{208}$ of the platform 208. The end effector 302 is then moved in the direction D1 to lower the tire 10 onto the platform 208, so that a lower one of the sidewalls 12 contacts the top surface 210 of the platform 208. As discussed above, a plurality of the position sensors 222 may be used to identify when the lower one of the sidewalls 12 is contacting the top surface 210.

As shown in FIG. 3B, once the tire 10 is positioned against the top surface 210, the system 100 will actuate the guide rollers 214 to move the guide rollers in an outward direction D3 from the retracted position (i.e. spaced inwardly from the bead portion 22 of the tire 10), to the extended position (i.e., contacting the bead portion 22 of the tire 10). Here, a lower portion of each guide roller 214 engages the inward-facing bead seat of the bead portion 22 of the lower sidewall 12, while the radial projection 218 formed at the distal end 216 of the guide roller 214 extends into the interior cavity 18 of the tire 10. Accordingly, the radial projections 218 of each guide roller 214 may interface with liner surface 16 of the tire 10 adjacent to the bead portion 22 of the lower sidewall 12.

Referring now to FIG. 3C, with the guide rollers 214 in the extended position and the lower sidewall 12 of the tire 10 secured against the top surface 210 of the platform 208, the manipulator 300 is moved to spread the bead portions 22 of the tire 10 apart to increase the width $W_B$ between the bead portions 22 at the interior cavity opening 26. Particularly, the end effector 302 is moved axially along the central axis $A_{208}$ of the platform in a second axial direction D2 away from the top surface 210 of the platform 208. With the lower bead portion 22 secured against the top surface 210 of the platform 208 by the guide rollers 214, and the upper bead portion 22 engaged with the fingers 304 of the end effector 302, movement of the end effector 302 away from the top surface 210 of the platform 208 causes the upper bead portion 22 to be pulled apart from the lower bead portion 22, as illustrated in FIG. 3C.

With reference to FIG. 3D, once the bead portions 22 of the tire 10 are spread apart from each other, the interior liner surface 16 is presented to the one or more lasers 220 of the ablation module 204. In the illustrated example, a first laser beam L1 is directed towards the interior liner surface 16 at the tread portion 14, and a second laser beam L2 is directed towards the interior liner surface 16 at the upper sidewall portion 12.

As shown, the one or more lasers 220 are then activated to emit a laser beam L1, L2, which is directed towards a desired portion of the interior liner surface 16. The laser beam L1, L2 is configured to clean and precondition at least a portion of the liner surface 16 of the tire 10, creating a respective preconditioned region R1, R2 of the liner surface 16, to prepare for an application of an adhesive. For example, the one or more lasers 220 may be operated to provide a laser beam L1, L2 at a power of 100 watts and with a wavelength of 1064 nm, a pulse repetition frequency ranging from 1 kHz to 1000 kHz, and a pulse duration ranging from 1 nanosecond to 500 nanoseconds.

With the one or more lasers 220 activated, the tire 10 is rotated in a direction D4 about the central axis $A_{208}$ of the platform 208, such that the preconditioned region R1, R2 is formed around a circumference of the interior liner surface 16, as shown in FIG. 3D. In some examples, the tire 10 is rotated at a rate ranging from 0.5 revolutions per minute to 3.0 revolutions per minute. The rotation rate is selected based on a total surface area of the preconditioned region R1, R2 that needs to be formed for the specific application, and the type of mold release agent that was used on the tire 10 during production.

As shown, because the guide rollers 214 are engaged with the bead portions 22 of the tire 10, rotation of the tire 10 in the direction D4 causes the guide rollers 214 to rotated about their respective axes $A_{214}$ in the direction D4. In the illustrated example, the platform 208 is passive and the end effector 302 is powered, whereby the tire 10 is rotated by rotation of the end effector 302 about the central axis $A_{302}$, which is coaxially aligned with the central axis $A_{208}$ of the platform 208. In other examples, the end effector 302 could be passive, while the platform 208 of the turntable 202 is powered.

In some examples, the tire 10 is rotated 360 degrees about the central axis $A_{208}$ to form a continuous annular preconditioned region R1, R2 around the circumference of the interior liner surface 16. As shown, a first preconditioned region R1 is formed around the tread portion 14, while a second preconditioned region R2 is formed around the upper sidewall 12. In other examples, one or both of the preconditioned regions R1, R2 may extend partially around the circumference of the tire 10 by either interrupting rotation of the tire 10 prior to a complete 360-degree cycle, or by interrupting operation of the laser 220.

As discussed above, the treatment station 200 may include an exhaust system 206 having nozzles 224 selectively disposed within the interior cavity 18 of the tire 10. As with the guide rollers 214, the nozzle 224 may be moved between a retracted position inwardly from the bead portions 22 and an extended position, whereby the nozzle 224 is disposed within the interior cavity 18. In the extended position, the nozzle 224 may be disposed adjacent to one or both of the preconditioned regions R1, R2, whereby the nozzle 224 is configured to remove fumes and debris resulting from the ablation of the liner surface 16.

Once the ablation step of FIG. 3D is complete, the tire 10 is removed from the turntable 202 by reversing the steps described above with respect to securing the tire 10 to the turntable 202. For example, as shown in FIG. 3E, the end effector 302 is initially moved in the first axial direction D1 towards the top surface 210 of the platform 208 to move the tire 10 into the relaxed state. With the tire 10 in the relaxed state, the guide rollers 214 can be moved in a retraction direction D6 to the retracted position, as shown in FIG. 3F. The tire 10 can then be lifted from the platform 208 and moved to a takeaway station. The aforementioned process can then be repeated with additional tires 10.

In some implementations of a tire preparation for adhesive process, a succeeding step includes adhering a peripheral item to the preconditioned region R of the liner surface 16. In some examples, the peripheral item may be a sensor or chip, such as an RFID chip. In some examples, the adhesive is applied directly to the preconditioned region R1, R2. Alternatively, in some examples the adhesive may be applied to a bottom surface of the peripheral item which is installed onto the preconditioned region R1, R2 of the liner surface 16.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of preparing a tire surface region, the method comprising:
   providing one or more lasers each configured to emit a laser beam;
   positioning a tire and the one of the lasers in proximity to one another;
   activating the one or more lasers and directing a laser beam of each of the one or more lasers at the tire surface region of the tire, the laser beam of each of the one or more lasers operable to precondition a region of the tire surface region;
   rotating at least one of the tire and at least one of the laser beams to precondition one or more regions of the tire; and
   ablating the tire surface region of the tire.

2. The method of claim 1, wherein activating the one or more lasers includes activating a first laser having a first laser beam directed at a tread portion of the tire surface region and activating a second laser having a second laser beam directed at a sidewall portion of the tire surface region.

3. The method of claim 2, wherein the activating the one or more lasers includes operating the one or more lasers at an output of 100 watts, a wavelength of 1064 nm, a pulse repetition frequency ranging from 1 kHz to 1000 kHz, and a pulse duration ranging from 1 nanosecond to 500 nanoseconds.

4. The method of claim 1, wherein the rotating step further includes rotating at least one of the tire and at least one of the laser beams 360°.

5. The method of claim 1, wherein the positioning step further includes providing an end effector and positioning the one or more lasers by connecting the end effector to the one or more lasers.

6. The method of claim 5, wherein the positioning step further includes providing an end effector and positioning the tire by connecting the end effector with the tire.

7. The method of claim 1, wherein the ablating step further includes providing a vacuum system for removing byproducts generated during the ablating step.

8. The method of claim 1, further including providing an ablating system which includes a treating station and a manipulating station.

9. The method of claim 8, wherein the tire includes a first sidewall and a second sidewall, the method further including
   securing the first sidewall to the treating station and moving the second sidewall away from the first sidewall.

10. The method of claim 1, further including
    adhering one or more sensors to one or more preconditioned regions of the tire.

11. A system for preparing an interior surface of a tire for an adhesive, the tire including an interior cavity defined by a pair of sidewalls each including an annular bead portion, the system comprising:
    a turntable having a platform rotatable about a first axis;
    an ablation module disposed within the platform and including one or more lasers;
    a plurality of guide rollers extending from the platform; and an exhaust system disposed adjacent to the one or more lasers.

12. The system of claim 11, further comprising a manipulator having an end effector operable between a first position adjacent to the turntable and a second position spaced apart from the turntable.

13. The system of claim 12, wherein the end effector is rotatable about a second axis, wherein in the first position the second axis is coaxially aligned with the first axis and in the second position the second axis is spaced apart from the first axis.

14. The system of claim 12, wherein the end effector includes a plurality of fingers operable between a retracted position spaced radially inwardly from the bead portion of one of the sidewalls, and an extended position contacting the bead portion of the one of the sidewalls.

15. The system of claim 11, wherein the one or more lasers include a 100 watt Q-switch fiber laser operating at a frequency of 1064 nm within a pulse rate range of 1 to 1000 kHz.

16. The system of claim 11, wherein the one or more laser is a 200 watt MOPA fiber laser operating at a frequency of 1064 nm within a pulse rate range of 0 to 1000 kHz.

17. The system of claim 11, wherein each of the guide rollers is operable between a retracted position spaced inwardly from the tire, and an extended position contacting the tire.

18. The system of claim 17, wherein each of the guide rollers is rotatable about a respective third axis parallel to the first axis, and includes a radial projection configured to extend into an interior cavity of the tire when the guide rollers are in the extended position.

19. The system of claim 11, wherein the exhaust system is configured to be disposed within the interior cavity of the tire.

20. The system of claim 11, further comprising a plurality of sensors disposed adjacent to the platform and configured to measure a position of the tire relative to the platform.

* * * * *